J. R. CLAY.
SHIP'S STEERING GEAR.
APPLICATION FILED MAY 13, 1913.
1,128,661.
Patented Feb. 16, 1915.
3 SHEETS—SHEET 1.
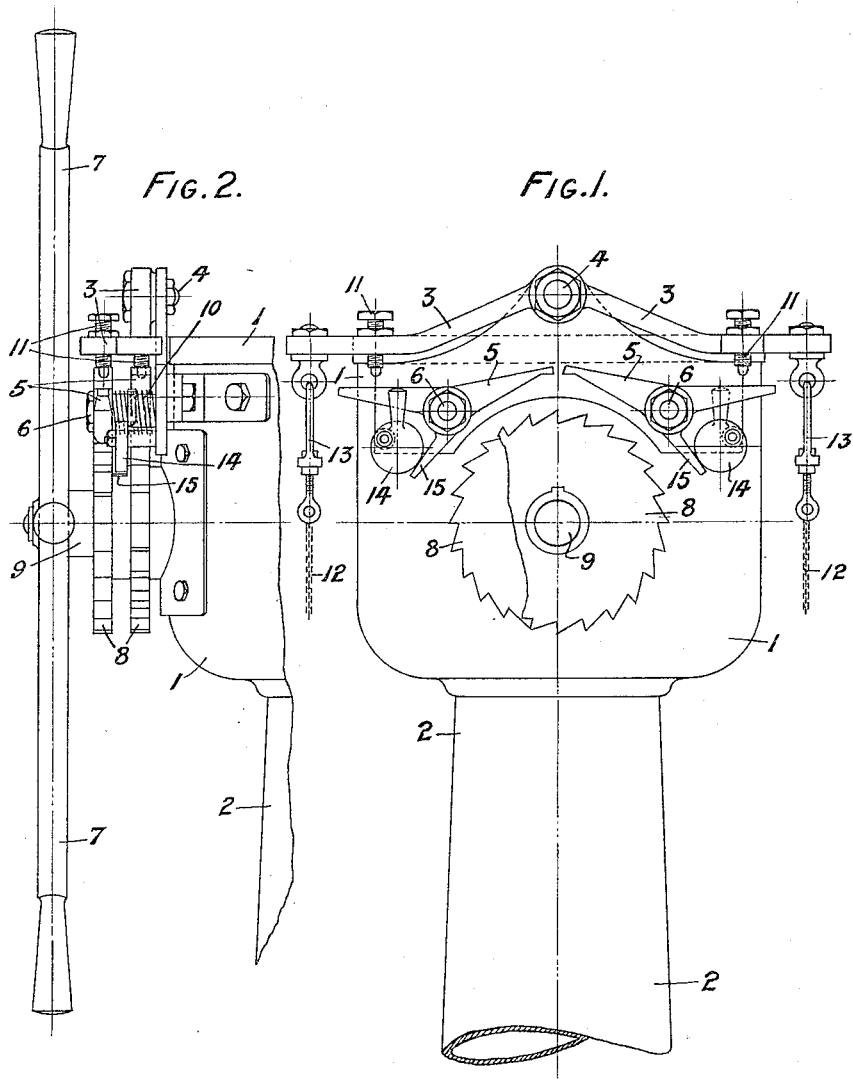
WITNESSES:
John C. Sanders
H. B. Cottrell
INVENTOR:
James Richard Clay
By Wm. Wallace White
ATTY.

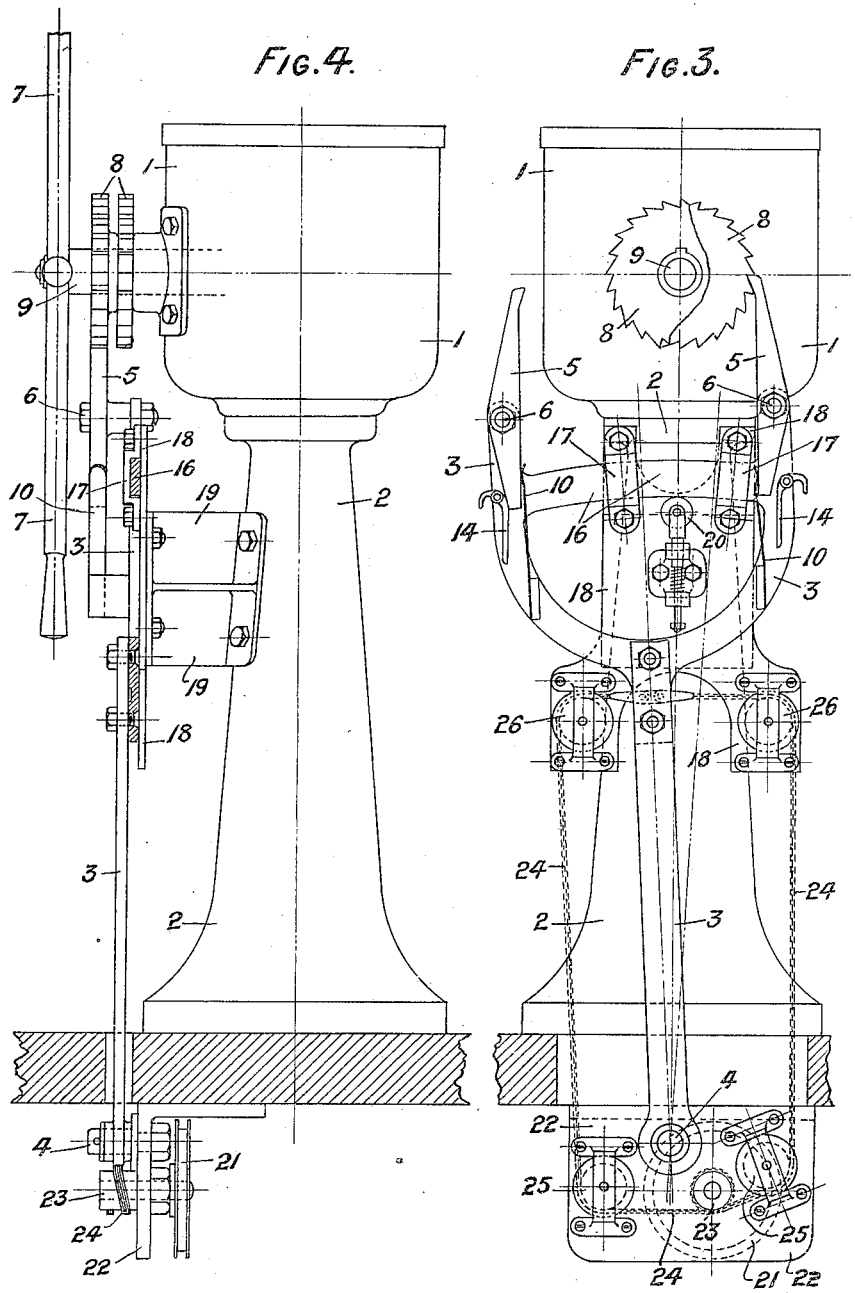

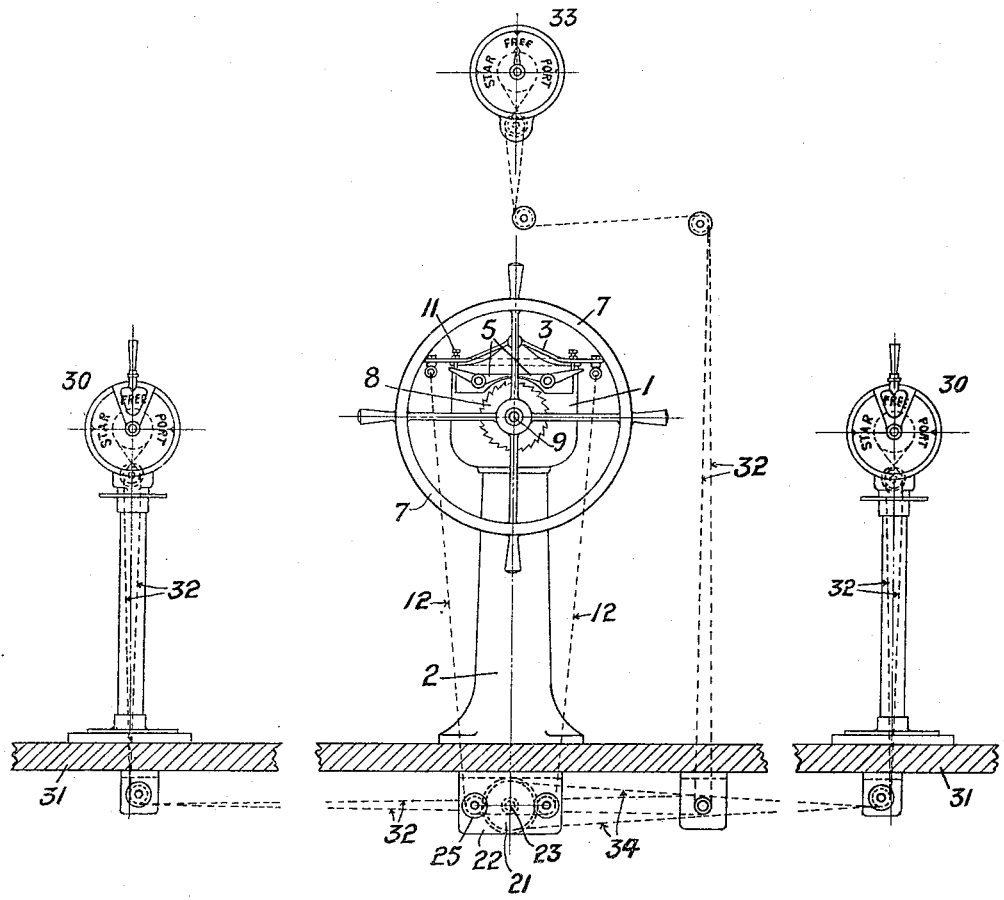

UNITED STATES PATENT OFFICE.

JAMES RICHARD CLAY, OF BOOTLE, ENGLAND.

SHIP'S STEERING-GEAR.

1,128,661.　　　　Specification of Letters Patent.　　Patented Feb. 16, 1915.

Application filed May 13, 1913. Serial No. 767,248.

*To all whom it may concern:*

Be it known that I, JAMES RICHARD CLAY, a subject of the King of England, residing at Bootle, in the county of Lancaster, England, have invented new and useful Improvements Connected with Ships' Steering-Gear, of which the following is a specification.

This invention has reference to mechanism or machinery used on board ship for steering, of the type wherein there is employed in connection with the part of the gear operated by the quartermaster, a locking means or mechanism consisting of double pawls and ratchet wheels, and the pawls are adapted to be operated by the man in charge of the navigation of the ship, by which the part of the steering gear which is operated by the quartermaster (which generally is near the bridge or other place of command, while the steering engine or machinery proper, is near the stern of the ship) is prevented from being moved in the wrong way on receiving an order from the man in charge or command of the ship, and thereby prevent mishaps taking place by the orders sent not being carried out.

The invention has for its object, primarily, to provide an improved arrangement of mechanism of the kind referred to in which are employed in connection with the steering wheel pedestal or carrier, ratchet toothed holding or locking wheels, with which operate pawls or the like, which engage and disengage with these wheels, and which are operated from the steering gear telegraph transmitter, which is operated by the commander or man in charge of the ship through which orders are transmitted to the quartermaster; and by which means the ratchet and pawl gear is so set and actuated, that the quartermaster cannot move his steering mechanism so as to operate the steering engine or machinery valve controlling or actuating mechanism, as to work them and the rudder in the wrong direction, that is in a direction opposite to that indicated by the receiver instrument from which the quartermaster receives his orders.

In an apparatus of this kind as just referred to, according to this invention, the pawls are arranged so that they can be rocked on their pivots by the ratchet wheel which they work in connection with, when being revolved in one and the required direction, without the movement of the lever, arm, or like part, which moves them, or causes them to move into and out of action with their respective ratchet wheels, and is actuated by the navigator or commander; and these pawls, in one arrangement hereinafter described, are mounted on the head of the steering wheel pedestal, and operate in connection with ratchet wheels, arranged side by side on the same axis, and having oppositely disposed teeth; the pawls being mounted on pivots on opposite sides of the axis of the wheels, and disposed in opposite arrangement; and pressed toward the wheels by springs or weights; and capable of being moved away by the teeth of the wheels. These pawls are operated by a double lever or beam, and connected with the steering telegraph motion transmission means, through chains or the like; so that according to which direction the telegraph is moved, so will be moved the lever and pawls. The connections from the telegraph may be at the ends of the levers.

The springs—or weights—used in connection with the pawls allow the one in action to be raised over the teeth of the ratchet wheel when revolving in the free direction, and to keep them in contact with the part on or connected with the lever which operates them.

The invention will be further described in connection with the accompanying drawings, which illustrate it.

In these Figure 1 is a front elevation, and Fig. 2 a side elevation of one arrangement of parts; while Figs. 3 and 4 are front elevation and side elevation of a slightly modified arrangement. Fig. 5 shows the general arrangement of telegraph and the steering gear hand actuated mechanism.

In the arrangement and combination shown in Figs. 1 and 2, the pawls referred to are operated by a double lever or beam, mounted centrally over them; and the pivots of the pawls are arranged in the same horizontal plane, but on opposite sides of the vertical plane of the steering wheel pedestal.

In the drawings, 1 is the head of the steering wheel pedestal; and 2 is its column, which will be fixed on the deck or floor in the usual way.

3 is the double lever or beam pivoted at 4; and 5 are the pawls, pivoted at 6.

7 represents the handwheel of the gear for operating the valve or controlling means of the steering engine, which may be assumed to be near the stern of the ship; while the apparatus shown will be in the wheel house, near the bridge.

8 are the two ratchet wheels having oppositely disposed teeth. They are fixed on the hand wheel shaft 9, and are arranged to revolve with it.

The pawls 5 are pivoted between their two ends, and they are only operated by the steering telegraph from the bridge during the transmission of an order one of them being moved out of engagement from its ratchet wheel 8, and the other one being released for reëngagement with its ratchet wheel. When each pawl is released it is pressed into engagement with its ratchet wheel by a spring 10, which in the case shown is of spiral form at the back of the pawl on the pivot pin 6. These pawls are not directly connected to the double arm or lever 3, but their tail ends are operated upon in the manner described, by adjustable studs 11, screwed through the lever; and when one stud is pressing on the tail of one pawl, and holding its active end out of engagement with its ratchet wheel 8, the other stud 11 will be in its upper position, and out of contact with the tail of the other pawl, which will then be the active one. In the case shown, this yoke or double lever 3 is operated by chain connections 12, connected up with its ends, and having tightening screws and nuts 13 on it. And it is to be assumed this chain 12 will pass under pulleys where change of direction takes place, and will be suitably guided by them, and connected up with the chains connected with the steering telegraph, as shown in Fig. 5, and hereinafter described.

It will be seen, when the actuating lever 3 is moved in one direction, it will hold one pawl out of engagement with its wheel 8; while, on the other hand, it will allow the other pawl to move into engagement with its ratchet wheel 8, and so prevent the steering wheel 7 being turned in a direction opposite to that according to the order transmitted by the telegraph; the springs 10 allowing at the same time, the wheel 8 (which for the time being is operated in conjunction with the pawl 5) to be turned in the direction corresponding with the order of the telegraph transmitted. In so doing, the teeth of the engaged wheel will lift up the engaging pawl as it is revolved by the quartermaster; the pawls simply lifting and clicking over the teeth of the ratchet wheel.

In connection with the pawls 5, means are provided for throwing and holding them both out of action, if and when desired; and in the case shown in Figs. 1 and 2, this means consists of eccentrically mounted cams 14, having handles on them, and operating upon a projection 15 on the pawls; so that when both cams are moved into the position shown, the pawls will be held in the position where both are out of engagement with the wheels 8, while at the same time, the lever 3 may be moved by the telegraph; there being sufficient free movement of the studs 11, and between the pawls 5 and the cams 14, to allow of this.

In the modification shown in Figs. 3 and 4, the pawls 5 are carried by a double forked or bifurcated arm or lever 3, hinged at 4 at its lower end, directly beneath the deck or floor. The pawls 5, in this case, are vertically disposed, and are pressed toward the wheels 8 by the springs 10, so that their operative ends can be moved away from the teeth of the wheels when these wheels are revolved by the hand wheel 7, in the free and correct direction.

The spring 10 normally presses the tails of the pawls 5 to the backs of the cams 14, which in this case are of different form to those shown in Figs. 1 and 2, but are employed for the same purposes, and effect the same ends as those above described.

The pawl carrying arm or lever 3, is guided at its upper part by a cross bar 16, extending across the fork; and which passes through clips or eyes 17, secured to the outside of a plate 18, carried by a bracket 19 from the column 2 of the pedestal. And this bar 16 is normally pressed on by a spring pressed roller 20, carried on the plate 18, so as to act as a steadier and holder.

The arm or lever 3 is preferably operated from the ship's steering gear telegraph in the case shown, by chains, in case the transmitting means is chain; and the chains are connected up to a wheel 21 on the bracket 22, which carries the arm or lever pivot 4; so that, as the steering telegraph chain is moved in one direction or the other, it will revolve the wheel 21 to which it is fastened, in one direction or the other. The spindle of this wheel 21 has on it, a pulley 23, around which the chain 24 is passed one turn, and is connected to same; and this chain passes over pulleys 25 and 26 to the upper end of the lower portion of the arm 3, so that as the pulley 23 revolves, the arm or lever 3 will be pulled in one direction or the other.

In the general arrangement shown in Fig. 5, 30 represents the steering telegraph transmitters of the ship one of which is placed on each end of the bridge 31; and 32 represents the chain connections for transmitting motion from these steering telegraph transmitters to the receiver 33, which will be in the wheel house, and generally close to, and on the same level as the bridge, and extending from it. From these chains 32—when chains are used—lengths of chain 34 lead to the pulley 21.

The flexible connections 32 of each transmitter 30 engage with the intermediate pulley disposed between the pulley 21 and the pulley of the right hand transmitter 30. This intermediate pulley is geared with the pulley 21 and is also geared with the receiver 33; thus, if either transmitter 30 is actuated, the intermediate pulley will be rotated and thereby operate the other transmitter, the receiver 33 and the pulley 21.

The indicator or receiving instrument 33 will be placed in the usual position in the wheel house, in relation to the steering apparatus in it.

What is claimed is:—

1. Ship's steering gear, comprising a stand; a hand wheel adapted to be operated by the navigator or commander; a ship's steering telegraph apparatus; reversely arranged double ratchet wheels; a pivoted lever arm actuated by the ship's steering telegraph apparatus; pawls which are carried on pivots and work in connection with said ratchet wheels; and are disposed between the said lever arm and the ratchet wheels, and are adapted to be rocked about their pivots by the said lever arm, and cam devices, adapted to hold both pawls out of engagement from the ratchet wheels, so as to disconnect the locking or preventative means from the steering mechanism, at will; substantially as set forth.

2. Ship's steering gear, comprising a hand operated part and a hand wheel stand adapted to be operated by the navigator of the ship, and a locking means connected with the hand wheel pillar, and comprises ratchet wheels, a pivoted vibrating lever, two spring pressed pawls mounted on the lever and normally pressed toward the ratchet wheels in connection with which they work, and are moved to and from such wheels by the lever; substantially as set forth.

In testimony whereof I have signed my name to this specification in the presence of two subscribing witnesses.

JAMES RICHARD CLAY.

Witnesses:
  TOWERVILLE GOODALL,
  EDWARD HUGHES.

Copies of this patent may be obtained for five cents each, by addressing the "Commissioner of Patents, Washington, D. C."